United States Patent
Omura (10) Patent No.: US 10,828,238 B2
(45) Date of Patent: Nov. 10, 2020

(54) DRUG FEEDER

(71) Applicant: TOSHO, INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 0 days.

(21) Appl. No.: 16/472,007

(22) PCT Filed: Dec. 26, 2017

(86) PCT No.: PCT/JP2017/046757
§ 371 (c)(1),
(2) Date: Jun. 20, 2019

(87) PCT Pub. No.: WO2018/128133
PCT Pub. Date: Jul. 12, 2018

(65) Prior Publication Data
US 2019/0328617 A1    Oct. 31, 2019

(30) Foreign Application Priority Data

Jan. 4, 2017 (JP) .................................. 2017-000159

(51) Int. Cl.
*A61J 7/00* (2006.01)
*B65G 47/14* (2006.01)

(52) U.S. Cl.
CPC ........ *A61J 7/0076* (2013.01); *B65G 47/1457* (2013.01); *B65G 2201/027* (2013.01)

(58) Field of Classification Search
None
See application file for complete search history.

(56) References Cited

U.S. PATENT DOCUMENTS

2011/0170655 A1* 7/2011 Yuyama .................. G07F 11/66
377/6
2011/0178634 A1* 7/2011 Yuyama .................. B65B 5/103
700/232

(Continued)

FOREIGN PATENT DOCUMENTS

JP        2-193809 A    7/1990
JP        6-61832 U     9/1994
(Continued)

*Primary Examiner* — Gene O Crawford
*Assistant Examiner* — Ayodeji T Ojofeitimi
(74) *Attorney, Agent, or Firm* — Birch, Stewart, Kolasch & Birch, LLP (57) ABSTRACT

A double rotation type drug feeder having an easily cleanable, simple structure is provided. The drug feeder includes a rotatable annular first rotator 20 that has a mount surface 23 on which drugs are placed and that is rotatable about a first rotation axis, a second rotator 30 that is disposed at a fixed position on an inner side of the first rotator 20 while being rotatable about a second rotation axis, inclined with respect to the first rotation axis, the second rotator 30 transporting the drugs onto the mount surface 23, restricting members 71 and 72 that align the drugs disposed on the mount surface 23, and multiple support members 40 that support the first rotator 20 and the second rotator 30 mounted thereon from below the first rotator 20 and the second rotator 30. The multiple support members 40 include a driving member 55 that drives the first rotator 20 and the second rotator 30 to rotate.

12 Claims, 7 Drawing Sheets

(56) References Cited

U.S. PATENT DOCUMENTS

| | | | |
|---|---|---|---|
| 2013/0284755 A1* | 10/2013 | Yuyama | A61J 7/02 221/13 |
| 2014/0014678 A1* | 1/2014 | Yuyama | G07F 17/0092 221/277 |
| 2014/0103063 A1* | 4/2014 | Yuyama | G07F 11/18 221/306 |
| 2015/0197391 A1* | 7/2015 | Yuyama | B65D 83/04 221/2 |
| 2015/0217929 A1* | 8/2015 | Morita | B65B 35/08 221/265 |
| 2016/0167866 A1 | 6/2016 | Omura | |
| 2016/0229564 A1 | 8/2016 | Koike et al. | |
| 2017/0135905 A1 | 5/2017 | Yuyama | |
| 2017/0216150 A1 | 8/2017 | Mitani | |

FOREIGN PATENT DOCUMENTS

| | | |
|---|---|---|
| JP | 9-150939 A | 6/1997 |
| JP | 2002-153541 A | 5/2002 |
| JP | 2015-23969 A | 2/2015 |
| JP | 2016-7512 A | 1/2016 |
| WO | WO 2012/099189 A1 | 7/2012 |
| WO | WO 2015/041220 A1 | 3/2015 |
| WO | WO 2016/002650 A1 | 1/2016 |
| WO | WO 2016/013553 A1 | 1/2016 |

\* cited by examiner

DRUG FEEDER

TECHNICAL FIELD

The present invention relates to a drug feeder that automatically supplies solid drugs, such as tablets or ampoules, for automatic medicine dispensation at hospitals, pharmacies, or other facilities. Specifically, the present invention relates to a drug feeder that randomly stores a large number of drugs having the same shape and that successively and sequentially discharges these drugs one after another by aligning these drugs using a rotator.

BACKGROUND ART

Examples known as an arranging and feeding device, or drug feeders, that transports drugs, such as tablets having the same shape, while arranging the drugs in a line include a device that includes a turn table, which rotates at a constant speed, and a fixed external wall disposed along the outer periphery of the turn table. This device also includes a fixed flow-directing guide and a dispensing portion. The flow-directing guide guides, radially outward, objects that have been carried on the upper surface of the turn table and that have come into contact with the flow-directing guide. The dispensing portion extends through the external wall and guides the objects that have been transported thereon on the upper surface of the turn table along the external wall outward from the surface of the turn table. This device also includes width restricting means and a height restricting member. The width restricting means restricts the width of the dispensed products using a gap between opposing inner and outer members included in the dispensing portion. The height restricting member is disposed in front of the dispensing portion to restrict the height of the dispensed products (refer to, for example, PTL 1). The turn table has a flat disc shape.

In order to be capable of holding more objects than in the case of using this flat disc-shaped turn table, a device including a so-called flanged rotational container has been developed. The flanged rotational container includes a rotator having a central portion recessed downward into a bowl shape or inverted conical shape and an upper peripheral portion formed into a flange shape (refer to, for example, PTL 2). The following two types of device are known as rotary parts feeders including this flanged rotational container:
  a device including a fixed flow-directing guide whose shape has been changed from a shape corresponding to the flat upper surface of the turn table into a shape adapted to the curved inner surface of the recessed portion of the flanged rotational container; and
  a device including another rotator instead of the fixed flow-directing guide, the rotator being held in a horizontal flanged rotational container in an inclined manner.

Known is a drug feeder that includes a driving unit, disposed so as to be fixed to a drawer rack of a drug packaging machine or other places for power supply or control, and a drug cassette, attachable to and detachable from the driving unit for easy drug replenishment or for other purposes. This drug feeder randomly stores a large number of drugs in the drug cassette and discharges the drugs one by one from the drug cassette by intermittently or continuously operating the driving unit as appropriate (refer to, for example, PTL 3). This drug cassette includes a container unit, which can hold a large number of solid drugs, and an arrangement disc disposed in the container unit so as to be rotatable about its axis. This drug cassette also includes a large number of vane-shaped partition walls, which are disposed on the outer peripheral surface of the arrangement disk to partition an annular gap between the container unit and the arrangement disk into a large number of compartments at a regular pitch, and a partition board, which is disposed so as to face an outlet port formed at a portion of the bottom portion of the container unit to partition part of the annular gap, the portion of the bottom portion functioning as an undersurface of the annular gap. This drug cassette causes the drugs in the compartments to fall one by one from the outlet port as a result of axial rotation of the arrangement disk caused by rotation driving of the driving unit.

Such existing drug feeders are categorized into the following types:
  a so-called disc rotation type including a turn table having a flat upper surface employed as a rotator (refer to, for example, PTL 1);
  a so-called flange rotation type including a flanged rotational container employed as a rotator (refer to, for example, PTL 2); and
  a so-called arrangement disk rotation type including an arrangement disk having partition walls disposed at the outer periphery, the disk being employed as a rotator (refer to, for example, PTL 3).

Specifically, among the drug feeders in the respective categories having the same size, the disk rotation type drug feeder has the smallest drug capacity, the arrangement disk rotation type drug feeder has the largest drug capacity, and the flange rotation type drug feeder has an intermediate drug capacity. A drug feeder having a large capacity is preferably usable in such an operation as to be replenished with drugs while being inactive and not replenished with drugs during successive discharge. A drug feeder having a small capacity, on the other hand, is preferably usable in such an operation as to be fed drugs as needed.

In view of the above-described difference in capacity or other properties, the arrangement disk rotation type drug feeders have been frequently used for drug packaging machines or other machines that are unsuitable for individual feeding of drugs to each feeder as needed. The reason why feeding of drugs to each feeder as needed is difficult in these machines is because a drug packaging machine or another machine includes a large number of drug feeders in its storage for handling many types of drugs.

After an arrangement disk rotation type drug feeder is produced, changing or adjusting the shape or pitch of the partition walls on the outer periphery of the arrangement disk is difficult. Moreover, the arrangement disk rotation type drug feeder is required to be adapted to the profiles of drugs as much as possible. Thus, an arrangement disk rotation type drug feeder tends to be designed for a specific drug, allows drug feeders of the same type to handle drugs with only a narrow range of shapes, and frequently takes time prior to use for design or produce.

Thus, to address the increasing variation of solid tablet drugs due to the recent increase of the types of drugs by expanding the range of shapes of drugs handleable by drug feeders of the same type, a small-sized drug feeder that can handle a wide range of drugs having different shapes and sizes has been developed (refer to, for example, PTL 4). This drug feeder is a modification of a flange rotation type drug feeder that can hold a large number of drugs among the drug feeders that can restrict the width or height of drugs.

This drug feeder includes as a rotator a so-called flanged rotational container whose central portion is recessed downward into a bowl shape or inverted conical shape and whose upper peripheral portion is formed into a flange shape. This feeder has a schematic structure similar to that of one of the flange rotation type drug feeders that includes a fixed flow-directing guide whose shape has been changed from a shape corresponding to the flat upper surface of the turn table into a shape adapted to the curved inner surface of the recessed portion of the flanged rotational container.

Specifically, this drug feeder includes a rotational container, which is rotatable about its axis, whose central portion is recessed to randomly store solid drugs, and whose peripheral portion is formed into a flange shape to allow the drugs to be arranged in an arc. This drug feeder also includes a fixed outer wall disposed along the outer periphery of the rotational container, and a flow guiding member that guides the drugs in the rotational container from the center portion to the peripheral portion. This drug feeder also includes a discharging portion, which is formed so as to extend through the external wall and guides the drugs that have been transported thereto on the upper surface of the peripheral portion of the rotational container along the external wall outward from the surface of the peripheral portion as dispensed products, and a height restricting member that restricts a height of the dispensed products before the dispensed products arrive at the discharging portion. This drug feeder also includes a width restricting member that is formed from a swing member disposed on the outer periphery of the opposing inner and outer members included in the discharging portion, the width restricting member restricting, by swinging, a width of the dispensed products by increasing or decreasing the width of the gap on the upper surface of the peripheral portion of the rotational container. This drug feeder also includes a holding-transporting mechanism formed from a belt transporting mechanism disposed on the inner periphery of the opposing inner and outer members, the holding-transporting mechanism extending to the inner side of the peripheral portion of the rotational container to transport the dispensed products at the speed higher than the speed of the peripheral portion during rotation of the rotational container, while holding the dispensed products together with the width restricting member.

CITATION LIST

Patent Literature

PTL 1: Japanese Unexamined Patent Application Publication No. 02-193809
PTL 2: Japanese Unexamined Utility Model Registration Application Publication No. 06-061832
PTL 3: Japanese Unexamined Patent Application Publication No. 2002-153541
PTL 4: Japanese Unexamined Patent Application Publication No. 2015-023969

SUMMARY OF INVENTION

Technical Problem

Such a drug feeder, or a so-called a modified flange rotation type drug feeder, is preferably provided for practical use by being replaced with some of a large number of arrangement disk rotation type drug feeders mounted on a tablet packaging machine or mounted on, for example, a tablet splitter that can receive only one or few drug feeders.

A modified flange rotation type drug feeder mounted, in place of an arrangement disk rotation type drug feeder, on a tablet counter or a drug counter for counting the number of successively transported drugs, in a device that fills a medicine bottle with drugs such as tablets can also handle drugs with various different shapes or sizes.

However, when a modified flange rotation type drug feeder is placed in front of a drug counter, a single drug feeder frequently handles an extremely large number of drugs in a short time. Thus, some of components of such a drug feeder, particularly, components facing a drug transport path require frequent cleaning. In the modified flange rotation type drug feeder, particularly, a delicate flow guiding member is disposed on the inner side of a rotational container. The inner side of the rotational container is not cleanable immediately after simply removing components such as a restricting member on the rotational container. In addition, removal of the delicate flow guiding member, among removal of the flow guiding member and the rotational container for washing the whole component, requires utmost caution and effort, and puts an enormous load on an operator.

An example method conceivable to address this is to use a so-called double rotation type drug feeder that includes inner and outer rotators to eliminate the need for a fixed flow guide in the rotators. As in the case of the modified flange rotation type drug feeder, such a double rotation type drug feeder has a larger drug capacity among the drug feeders that can restrict the drug width or the like, and can handle a wide range of drugs with various different shapes or sizes.

However, only the reduction of a delicate member merely temporarily eases mind of an operator. The drug feeder includes two relatively large rotational containers, increased from one, which increases the load on attachment or removal and avoids significant improvement of cleaning workability. Besides, the driving source for rotating a container or a detachable transmission mechanism has a double system, which involves an increase of the number of components and structure complication, and may cause undesired cost increase or degradation of maintainability.

The technical object is thus to provide a drug feeder that has a simple structure and is easily cleanable and that is based on a double rotation type drug feeder.

Solution to Problem

A drug feeder of the present invention (solution 1) has been made to address the above problem, and includes an annular first rotator that includes a mount surface on which drugs are placed, and that is rotatable about a first rotation axis; a second rotator that is disposed at a fixed position on an inner side of the first rotator while being rotatable about a second rotation axis, inclined with respect to the first rotation axis, the second rotator transporting the drugs onto the mount surface; a restricting member that aligns the drugs disposed on the mount surface; and a plurality of support members that support the first rotator and the second rotator mounted thereon from below the first rotator and the second rotator. The plurality of support members include a driving member that drives the first rotator and the second rotator to rotate.

In a drug feeder of the present invention (solution 2) according to the drug feeder of the solution 1, the driving member includes a large-diameter portion, which comes into contact with the first rotator, and a small-diameter portion, which comes into contact with the second rotator.

In a drug feeder of the present invention (solution 3) according to the drug feeder of the solution 1 or 2, an upper surface of the second rotator includes a recess at a center portion, and an inclined portion, located closer to an outer periphery of the second rotator than the recess and having a side away from the recess inclined downward. The inclined portion has a side away from the recess inclined downward at an uppermost portion of the second rotator occupying the fixed position.

A drug feeder of the present invention (solution 4) according to the drug feeder of the solution 3, further includes a sorting member located above the inclined portion, the sorting member pushing, back toward the recess at the uppermost portion, the drugs transported upward thereto by the inclined portion in accordance with rotation of the second rotator.

In a drug feeder of the present invention (solution 5) according to the drug feeder of the solution 4, the restricting member occupies a position above the mount surface to gradually reduce a width, in a radial direction of the first rotator, of the mount surface on which the drugs are mountable from an upstream side to a downstream side in a rotation direction of the first rotator.

In a drug feeder of the present invention (solution 6) according to the drug feeder of the solution 5, the restricting member includes a plurality of restricting members arranged in the rotation direction, and the drug feeder further includes a link mechanism that drives the plurality of restricting members in synchronization with each other to adjust amounts by which the restricting members gradually reduce the width.

Advantageous Effects of Invention

A drug feeder of the present invention (solution 1) is based on a double rotation type drug feeder. Specifically, in a drug feeder of the present invention, two rotational containers disposed on inner and outer sides transport solid drugs onto the mount surface of the outer first rotator from the inner second rotator with rotation of the rotational containers, and then the solid drugs are aligned by the restricting member. Thus, among types of drug feeder capable of restricting properties such as a drug width, the above drug feeder has a large drug capacity and handles a wide range of drugs with various different shapes or sizes, and has no need of including a fixed flow guide in the rotators.

In addition, both rotators, that is, the first rotator and the second rotator are mounted on the multiple support members to be held at fixed positions, and are rotated about their axes by any of the multiple support members with friction transmission. Thus, the driving member is allowed to have a simple structure. Moreover, both rotators mounted on the support members are prepared for friction transmission with the weight of both rotators. This structure thus eliminates the need for troublesome adjustments, such as gear engagement for coupling both rotators and the driving member together. Moreover, picking up both rotators mounted on the support member detaches both rotators from the support members to allow free movement of both rotators. Thus, this structure allows easy cleaning such as washing of the whole component or easy maintenance such as repair or replacement.

Thus, the present invention embodies a drug feeder that has an easily-cleanable simple structure based on a double rotation type drug feeder.

A drug feeder of the present invention (solution 2) includes a driving member coupled to both rotators, and includes rotation drive sources, such as electric motors, fewer than the rotators, enabling a cost reduction. In addition, to rotate the first rotator faster than the second rotator, the large-diameter portion of the driving member is brought into contact with the first rotator, and the small-diameter portion of the driving member is brought into contact with the second rotator. The driving member is thus constituted of a round columnar member including the large-diameter portion and the small-diameter portion. Thus, the driving member can be formed from a simple and reasonable member.

A drug feeder of the present invention (solution 3) in which the upper surface of the second rotator has a recess at the center portion has a larger drug capacity. The upper surface of the second rotator also has an inclined portion located closer to an outer periphery of the second rotator than the recess and having a side away from the recess inclined. Thus, while solid drugs are transferred from the second rotator onto the mount surface of the first rotator, each of the drugs is moved promptly and smoothly with the inclination of the inclined portion, and the number of moving drugs arranged side by side is restricted based on, for example, the width of the inclined portion.

Thus, even when the drug capacity is increased by the recess at the center portion of the upper surface of the second rotator, the amount of drugs transferred from the second rotator to the first rotator is prevented from exceeding with a simple structure.

A drug feeder of the present invention (solution 4) includes, besides a restricting member that operates on drugs on the mount surface of the first rotator, a sorting member that operates on drugs on the inclined portion of the upper surface of the second rotator. The sorting member pushes, back toward the recess, the drugs remaining on the inclined portion without being transferred from the second rotator to the first rotator due to the reasons such as the mount surface being filled with drugs. Thus, the amount of solid drugs transferred from the inclined portion onto the mount surface is adjusted to the amount appropriate for the width of the mount surface. Thus, the subsequent drug alignment is performed by the restricting member with light burden. The drugs can thus be neatly aligned on the first rotator even with the simple restricting member that only restricts, for example, the width and the lateral direction without restricting the height.

In a drug feeder of the present invention (solution 5), the restricting member occupies the position above the mount surface to gradually reduce the width, in the radial direction of the first rotator, of the mount surface on which the drugs are mountable, from the upstream side to the downstream side in the rotation direction of the first rotator. This structure includes the restricting member with a simple structure without a function of restricting the height. This structure thus enables a cost reduction and facilitates attachment or removal of the restricting member performed before or after attachment or removal of both rotators.

A drug feeder of the present invention (solution 6) includes multiple restricting members in the rotation direction of the first rotator, which intensifies an alignment function of the restricting member. The drug feeder also includes a link mechanism to drive the multiple restricting members in synchronization with each other to adjust the amounts by which the restricting members gradually narrow the width of the mount surface. The drug feeder is thus highly suitable or usable for drugs with a variety of shapes or sizes, and can collectively adjust the width restriction on the multiple restricting members. Thus, the adjustment can be easily and promptly performed.

DESCRIPTION OF EMBODIMENTS

Referring to the drawings, an example of a drug feeder to which the present invention is applied is described.

Here, for simplicity or other purposes, the drawings omit illustrations of components including a housing panel, fastening devices such as bolts, connecting devices such as hinges, electric circuits such as motor drivers, and electronic circuits such as controllers. The drawings mainly illustrate components required or related to the description of the invention.

Figure 1:
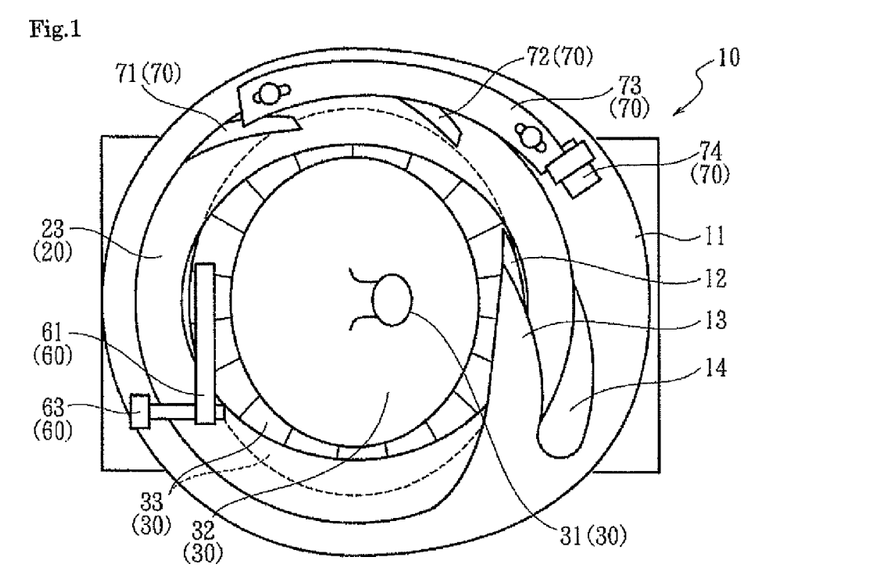
FIG. 1 is a plan view of an example of a drug feeder according to the present invention.
Figure 2:
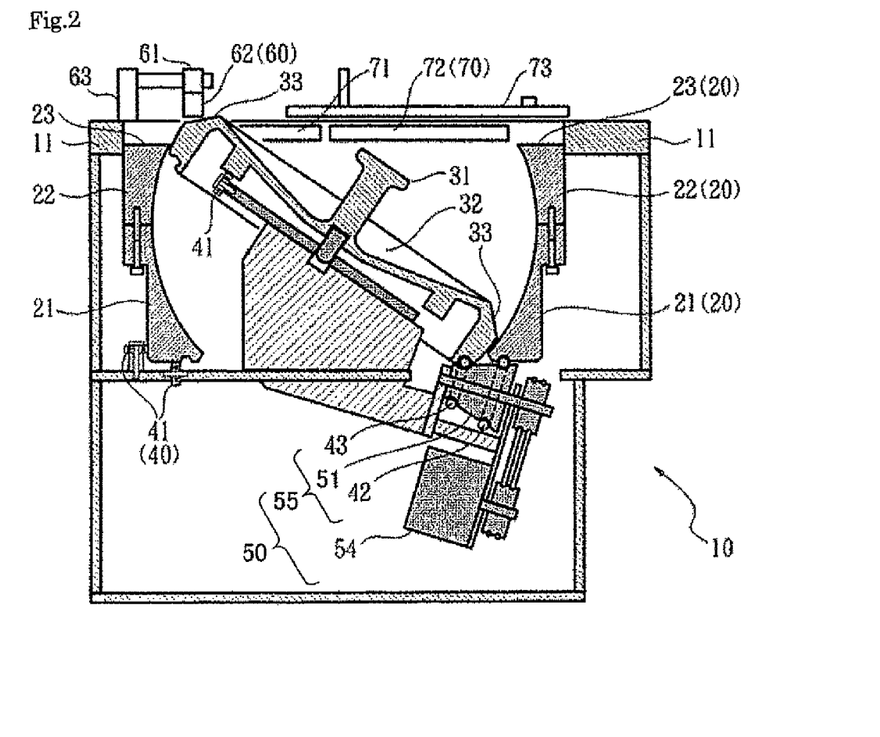
FIG. 2 is a cross-sectional view of the drug feeder illustrated in FIG. 1.
Figure 3:
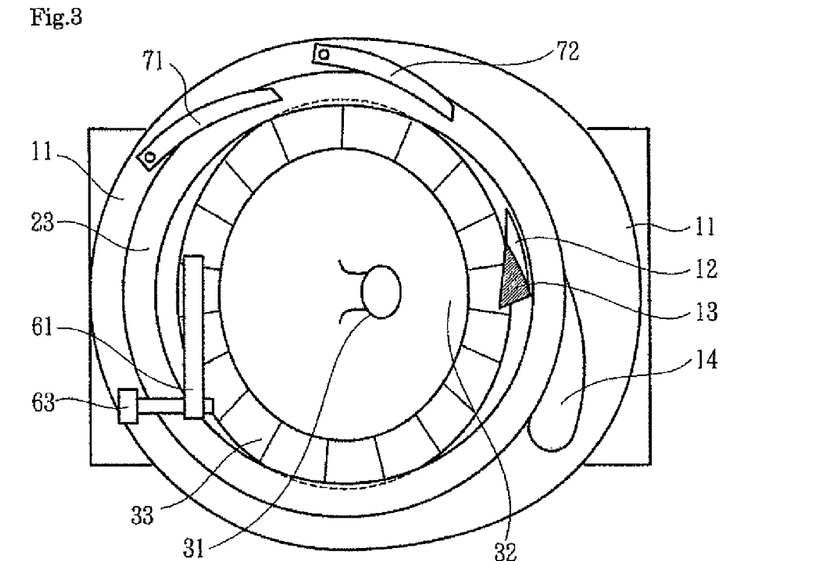
FIG. 3 is a plan view of a portion of the drug feeder illustrated in FIG. 1.
Figure 4:
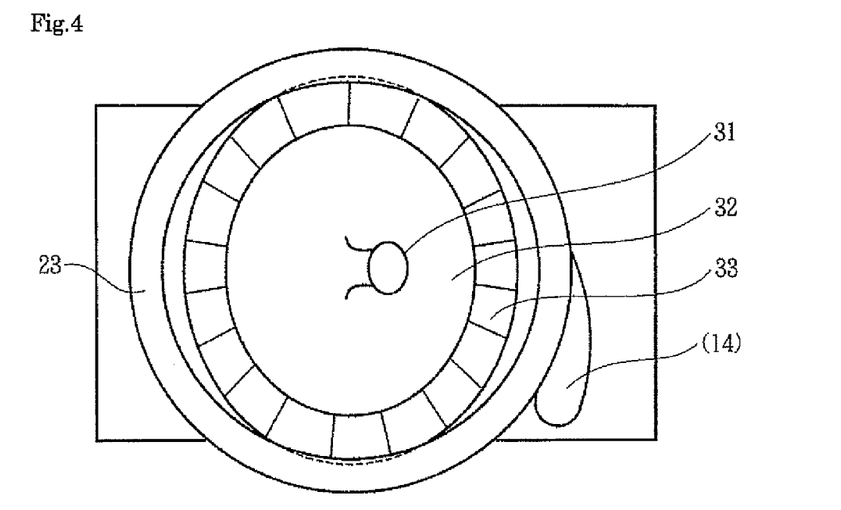
FIG. 4 is a plan view of another portion of the drug feeder illustrated in FIG. 1.

FIG. 1 is a plan view of almost the entirety of a drug feeder 10, and FIG. 2 is a vertically sectioned front view of the drug feeder 10. FIG. 3 is a plan view of the drug feeder 10 from which a link mechanism 73, disposed at an uppermost portion, and an upper layer portion of a peripheral wall 11 are removed. FIG. 4 is a plan view of the drug feeder 10 from which the peripheral wall 11, a sorting member 60 attached to the peripheral wall 11, and restricting members 71 and 72 are removed, besides the link mechanism 73 and the upper layer portion of the peripheral wall 11.

Figure 5:
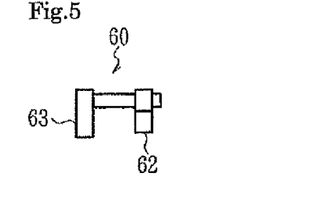
FIG. 5 is a front view of a sorting member included in the drug feeder illustrated in FIG. 1.
Figure 6:
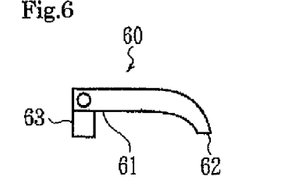
FIG. 6 is a right side view of the sorting member illustrated in FIG. 5.
Figure 7:
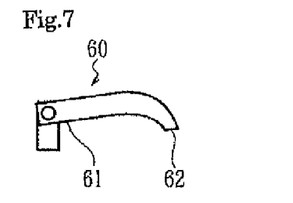
FIG. 7 is a right side view of the sorting member illustrated in FIG. 5 in a swinging state.
Figure 8:
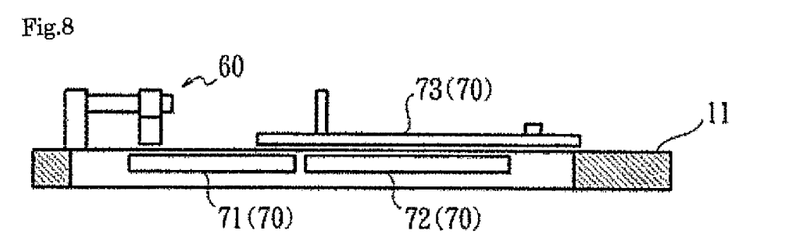
FIG. 8 is an exploded view of a main portion of the drug feeder illustrated in FIG. 1.

FIG. 5 is a front view of the sorting member 60, and FIG. 6 and FIG. 7 are right side views of the sorting member 60 in a swinging state. FIG. 8 is an exploded view of a main portion of the feeder, where components such as the peripheral wall 11 and a rotational container 80 are illustrated in a vertical sectional view, and a driving mechanism 50 in an outside view.

Figure 9:
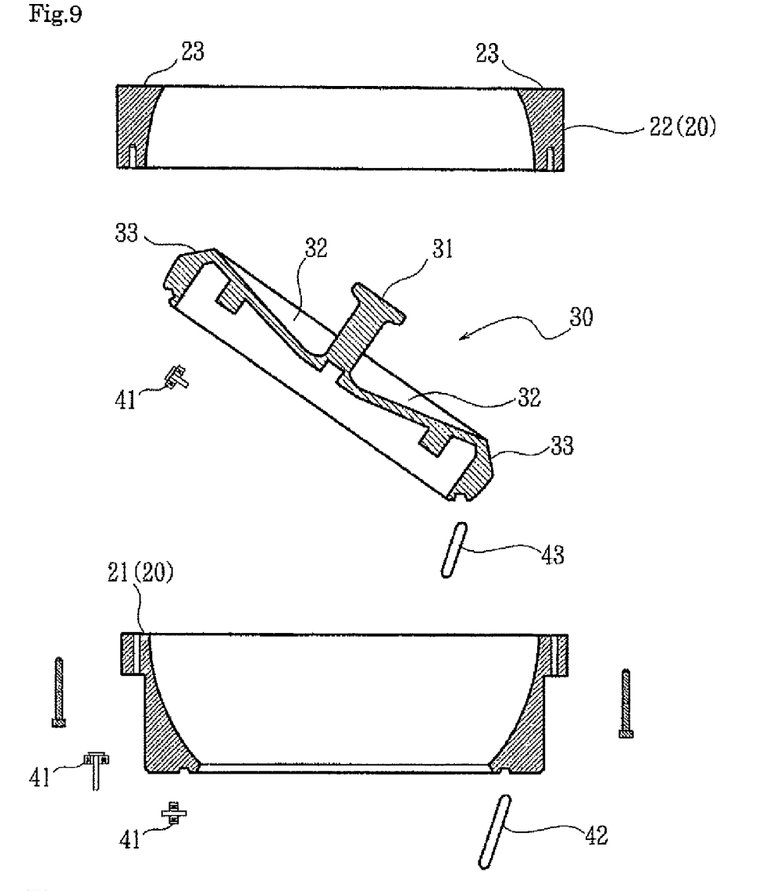
FIG. 9 is an exploded view of a rotational container included in the drug feeder illustrated in FIG. 1.
Figure 10:
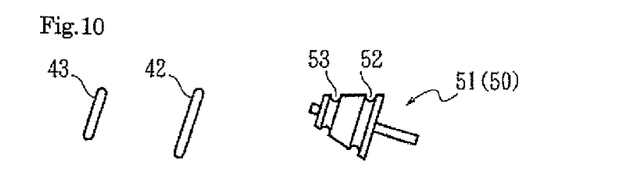
FIG. 10 is an exploded view of a driving member included in the drug feeder illustrated in FIG. 1.

FIG. 9 is an exploded view of the rotational container 80, where a first rotator 20 and a second rotator 30 are illustrated in a vertical sectional view. FIG. 10 is an exploded view of a driving member body 51 and two transmission members 42 and 43, which are respectively large and small and attached on the outer side of the driving member body 51.

As illustrated in FIG. 1 and FIG. 2, the drug feeder 10 is of a double rotation type. The drug feeder 10 includes a housing, a first rotator 20, which is an annular rotator disposed in the housing, and a second rotator 30, which is a tilting rotator disposed at a fixed position on the inner side of the first rotator 20. The drug feeder 10 also includes support members 40, which are supporting members that support the first rotator 20 and the second rotator 30 mounted thereon from below the first rotator 20 and the second rotator 30. The drug feeder 10 also includes a driving mechanism 50, which drives the first rotator 20 and the second rotator 30 to rotate, and a restricting mechanism 70, which is disposed on the upper side of the housing. A peripheral wall 11, which has a circularly hollowed center portion, is disposed at the uppermost portion of the housing. The first rotator 20 is disposed to have its upper end portion loosely fitted in the hollow of the peripheral wall 11, or disposed immediately below the hollow of the peripheral wall 11.

The first rotator 20 is held by the support members 40 to be rotatable about a first rotation axis. The second rotator 30 is held by the support members 40 to be rotatable about a second rotation axis, which is a line inclined with respect to the first rotation axis. The first rotator 20 is desirably held to be rotatable about a vertical line. The second rotator 30 is filled in the hollow of the first rotator 20 while being kept apart from the first rotator 20 with such a slight gap therebetween as to allow their rotations without allowing drugs to pass therethrough so that the first rotator 20 and the second rotator 30 constitute the rotational container 80 of a double rotation type drug feeder. In the drug feeder 10, the second rotator 30 rotates to transport drugs on the second rotator 30 onto a mount surface 23, which is a peripheral edge portion at the upper end of the first rotator 20, and the first rotator 20 rotates to transport drugs on the mount surface 23 to the restricting mechanism 70, and then to a fall outlet port 14. The restricting mechanism 70 aligns the drugs on the mount surface 23 sequentially transported by the rotation of the first rotator 20.

The drug feeder 10 also includes the sorting member 60 besides the above-described basic components.

As illustrated in FIG. 9, the first rotator 20 roughly includes a lower portion 21, having a diameter increasing toward the upper side, and an upper portion 22, having a diameter decreasing toward the upper side. The upper end of the upper portion 22 serves as the mount surface 23 on which drugs are placed. As illustrated in FIG. 8, the second rotator 30 is placed in the lower portion 21, the upper portion 22 is mounted on the lower portion 21, and the lower portion 21 and the upper portion 22 are coupled together with, for example, bolts to be integrated into the first rotator 20. Concurrently, the first rotator 20 and the second rotator 30 become inseparable, so that the first rotator 20 and the second rotator 30 move together like a single rotational container 80 when either the first rotator 20 or the second rotator 30 is raised, while the second rotator 30 is being allowed to rotate about its axis.

As illustrated in FIG. 1 or FIG. 2, the upper surface of the second rotator 30 serves as the inner bottom of the rotational container 80. At the center of the upper surface of the second rotator 30, a center projection 31 is disposed to allow the entirety of the rotational container 80 to be held when the center projection 31 is picked up. The upper surface of the second rotator 30 has a recess 32 at the center portion excluding the center projection 31 to increase the internal space of the rotational container 80. The upper surface of the second rotator 30 also includes an inclined portion 33, which is located closer to the outer peripheral side of the second rotator 30 than is the recess 32 and inclined downward as it extends further from the recess 32. The inclined portion 33 has a gentle sawtooth waveform throughout the periphery, for easy pickup of drugs, and extends further downward toward an outer side, that is, further from the center, in other words, the inclined portion 33 flares.

In the state where the second rotator 30 is disposed at the fixed position on the inner side of the first rotator 20, that is, in the state where the second rotator 30 is in the fixed position, the uppermost portion of the second rotator 30 is located above the mount surface 23. Even at the uppermost portion of the second rotator 30, at which the inclined portion 33 has smallest inclination, the inclined portion 33 has its portion away from the recess 32 inclined downward, and is useful to allow the picked-up drugs to roll along the inclination to be smoothly transported to the mount surface 23.

As illustrated in FIG. 2, the support members 40 include multiple bearing members 41, which are disposed separately at different positions, and a driving member 55, which drives the first rotator 20 and the second rotator 30 to rotate. The bearing members 41 mainly include, for example, radial bearings. Each bearing member 41 is a dedicated bearing that allows the outer peripheral surface of the rotator to come into contact with the outer peripheral surface or the undersurface of the first rotator 20 or the undersurface of the second rotator 30 to rotatably hold the first rotator 20 or the second rotator 30 in the fixed position.

The driving member 55 supports the first rotator 20 and the second rotator 30 together with the bearing members 41 to exert a function of rotatably holding the first rotator 20 and the second rotator 30 in the fixed positions. The driving member 55, which also exerts a rotation driving function, also serves as part of the driving mechanism 50.

All the components of the support members 40 are disposed at positions at which they come into contact with the undersurface or the outer peripheral surface of the first rotator 20 and the second rotator 30. Thus, when the rotational container 80 is to be installed in the housing, the rotational container 80 can be appropriately installed in the housing by being placed on the support members 40. When the rotational container 80 is to be removed from the housing, the rotational container 80 can be easily removed from the housing by being picked up.

The driving mechanism 50 includes the driving member 55, disposed below the rotational container 80, and a driving motor 54, which rotates the driving member 55 about its axis. As described above, the driving member 55 constitutes one or more of the support members 40. The driving member 55 includes a driving member body 51 and transmission members 42 and 43, attached to the driving member body 51. The transmission members 42 and 43 are ring-shaped or annular members, such as hard-rubber-made O rings. As illustrated in FIG. 10, of the transmission members 42 and 43, the first transmission member 42 is fitted, from the outside, to an annular groove in a large-diameter portion 52 of the driving member body 51 while having its inner side received in the groove. When the rotational container 80 is installed in the housing, the first transmission member 42 is in contact with the first rotator 20 to transmit rotation by friction transmission to the first rotator 20, while supporting the first rotator 20. Of the transmission members 42 and 43, the second transmission member 43 is fitted, from the outside, to an annular groove in a small-diameter portion 53 of the driving member body 51 while having its inner side received in the groove. When the rotational container 80 is installed in the housing, the second transmission member 43 is in contact with the second rotator 30 to transmit rotation by friction transmission to the second rotator 30, while supporting the second rotator 30. Thus, with the rotation of the driving member 55 about its axis, the first rotator 20 rotates about its axis at a relatively high speed, and concurrently, the second rotator 30 rotates about its axis at a relatively low speed.

As illustrated in FIG. 5 to FIG. 7, a sorting member 60 is mainly formed from a thin stick extending from a base end portion 61, serving as a fulcrum for swing, to a far end portion 62, serving as a swing end. The base end portion 61 is supported by a support portion 63 on or above the peripheral wall 11 or the first rotator 20, to allow the far end portion 62 to swing vertically about the base end portion 61. The sorting member 60 has a slightly curved portion near the far end portion 62. In the normal state, the far end portion 62 faces obliquely downward to slightly touch the inclined portion 33 due to its weight.

Most of drugs transported upward by the inclined portion 33 in accordance with the rotation of the second rotator 30 slip down from the inclined portion 33 to the mount surface 23, but some of the drugs may be transported to the uppermost portion of the second rotator 30 while being on the inclined portion 33 without slipping down from the inclined portion 33 to the mount surface 23. These drugs transported to the uppermost portion of the second rotator 30 come into contact with the far end portion 62, and are pushed back to the recess 32 with the urging force of the reaction. When this operation fails to be performed smoothly, the far end portion 62 swings upward for escape to prevent, for example, drugs from being broken.

As illustrated in FIGS. 1 to 3, the restricting mechanism 70 includes a first restricting member 71, disposed downstream of the sorting member 60 in the rotation direction of the first rotator 20, and a second restricting member 72, disposed downstream of the first restricting member 71 in the rotation direction of the first rotator 20. The restricting mechanism 70 also includes the link mechanism 73, which is coupled to the first restricting member 71 and the second restricting member 72 with pin-shaped shaft components or the like for allowing the restricting members to rotate, and a model receiver 74, which can receive a sample drug.

The first restricting member 71 and the second restricting member 72 occupy the upper portion of the mount surface 23, to gradually reduce the width, in the radial direction of the first rotator 20, of the mount surface 23 on which the drugs are mountable, from the upstream side to the downstream side in the rotation direction of the first rotator 20. Specifically, the first restricting member 71 and the second restricting member 72 each have its swing axis located closer to the peripheral wall 11, and its swing end located above the mount surface 23. Thus, the path along which the drugs on the mount surface 23 are transported has its width reduced from the outer periphery.

The link mechanism 73 drives both restricting members 71 and 72 in synchronization with each other to adjust the amounts by which both restricting members 71 and 72 gradually reduce the width of the mount surface 23. Specifically, both restricting members 71 and 72 swing concurrently and similarly in accordance with the movement of the link mechanism 73 in the longitudinal direction, so that the amounts by which both restricting members 71 and 72 narrow the width of the path along which the drugs are transported are adjusted in an interlocking manner.

When the link mechanism 73 is moved toward the sample drug stored in the model receiver 74, the link mechanism 73 moves in the longitudinal direction, and is then stopped at the position at which the far end of the link mechanism 73 comes into contact with the sample drug. Here, the swing end portion of the first restricting member 71 and the swing end portion of the second restricting member 72 narrow the width of the path along which the drugs on the mount surface 23 are transported into the width corresponding to one drug to follow the shape of the sample drug.

Downstream of the restricting mechanism 70, the peripheral wall 11 has a fall outlet port 14, which vertically extends through the peripheral wall 11. The peripheral wall 11 also has a discharge guide 13, which allows drugs on the mount surface 23 to be transported to the fall outlet port 14 with rotation of the first rotator 20. The discharge guide 13 extends from a portion of the peripheral wall 11 downstream of the fall outlet port 14 to the upper side of the mount surface 23, and has its far end portion protruding upward beyond the inclined portion 33. Thus, the drugs transported thereto on the mount surface 23 come into contact with the side wall of the discharge guide 13 and move along the side wall to the fall outlet port 14.

A transport surface guide 12, which extends from the lower side of the discharge guide 13 beyond the far end portion of the discharge guide 13, is disposed at the far end portion of the discharge guide 13. The transport surface guide 12 is located on the inner peripheral side of the mount surface 23, and has its upper surface located at the same level as the mount surface 23. This transport surface guide 12 can easily prevent undesired troubles from happening, such as drugs transported thereto on the mount surface 23 from falling toward the second rotator 30 in reaction to coming in contact with the discharge guide 13, or from becoming stuck between the first rotator 20 and the discharge guide 13.

Although not illustrated in detail, the upper surface of the mount surface 23 has a slightly swelling outer peripheral portion to easily prevent drugs from rolling down into the fall outlet port 14 due to, for example, an inertial force before the drugs are pushed to the fall outlet port 14 by the discharge guide 13.

Although not illustrated, a controller that controls the operation of the driving motor 54 and a power source that feeds operation power to the driving motor 54 and the controller are incorporated in the housing of the drug feeder 10 or disposed out of the housing. The drug feeder 10 may include, for example, a photosensor that detects drugs falling through the fall outlet port 14. In this case, the photosensor transmits a detection signal to the controller or a tablet counter.

The controller starts rotation control from a low-speed rotation. After a discharge of a first drug is detected and a discharge of a predetermined number of drugs are then detected, the controller switches the rotation control to a high-speed rotation. The controller also calculates the remaining quantity from the predetermined total number of drugs to be discharged and the number of drugs already discharged, and, in response to an arrival of the remaining quantity at a predetermined number, decreases the rotation speed or performs reverse rotation to prevent an undesired excessive fall after the completion of drug discharge.

Figure 11:
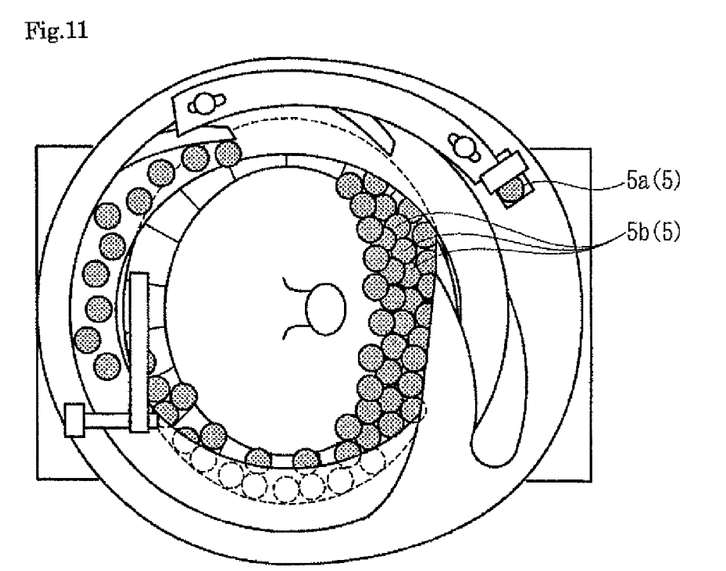
FIG. 11 is a plan view of the drug feeder illustrated in FIG. 1, in the state of aligning drugs stored in the drug feeder.
Figure 12:
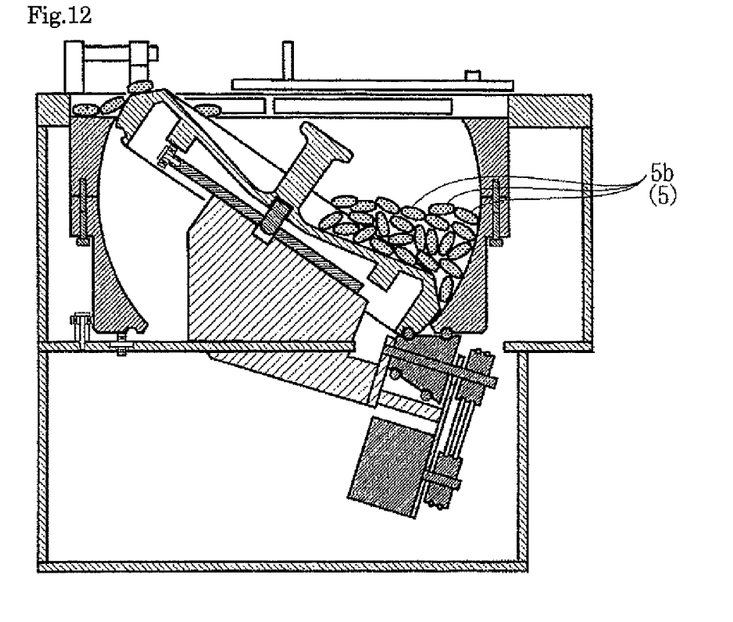
FIG. 12 is a cross-sectional view of the drug feeder illustrated in FIG. 11.
Figure 13:
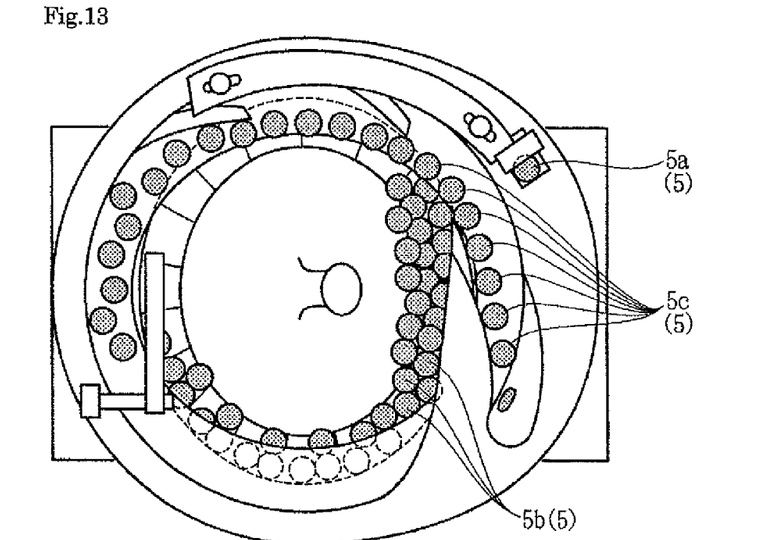
FIG. 13 is a plan view of the drug feeder illustrated in FIG. 1, in the state of transporting the aligned drugs to a fall outlet port.
Figure 14:
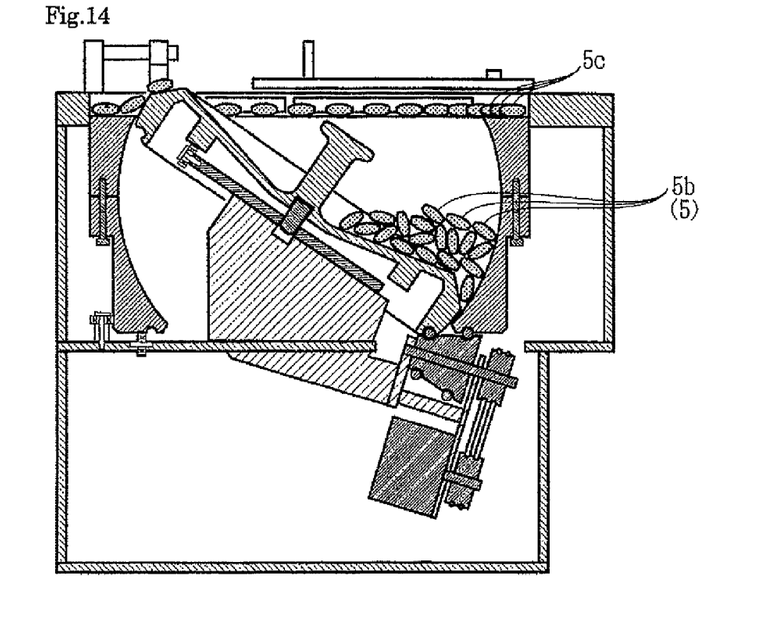
FIG. 14 is a cross-sectional view of the drug feeder illustrated in FIG. 13.
Figure 15:
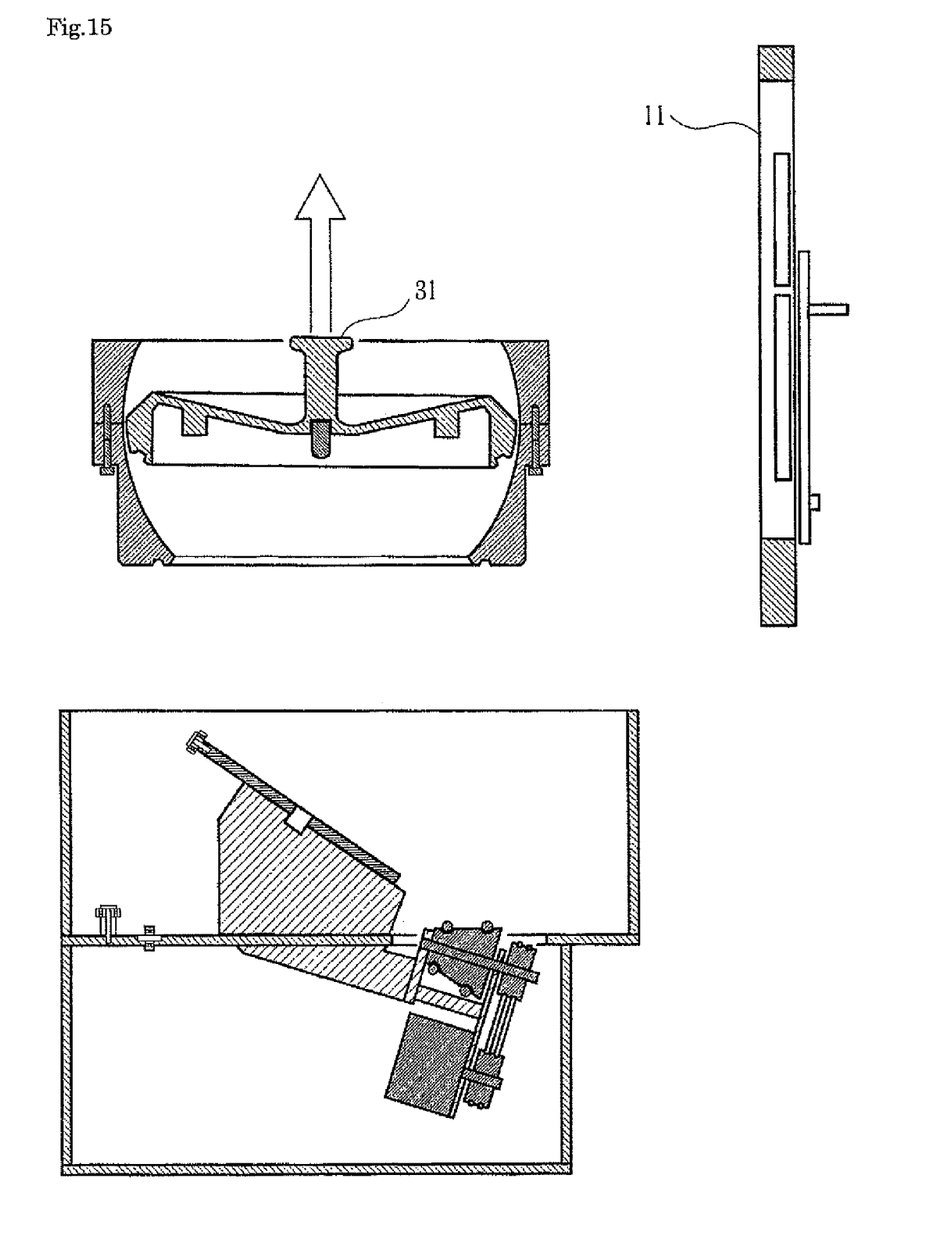
FIG. 15 is a cross-sectional view of the rotational container included in the drug feeder illustrated in FIG. 1, in the state of being removed from a housing.

The use and operation of the drug feeder 10 according to the present invention are described. FIG. 11 and FIG. 12 illustrate the start of an operation of aligning the drugs 5 stored in the rotational container 80 on the mount surface 23. FIG. 13 and FIG. 14 illustrate an operation of transporting the aligned drugs 5 from the mount surface 23 to the fall outlet port 14. FIG. 15 is a vertically sectioned front view, illustrating the rotational container 80 being removed from the housing. Each drug 5 may be also referred to as a model drug 5a, a randomly stored drug 5b, or an aligned drug 5c, depending on the situation.

As illustrated in FIG. 11 or FIG. 12, to be ready for successively feeding a large number of drugs 5 with the drug feeder 10, the width of the path along which the drugs are transported is narrowed and the drugs are randomly inserted prior to the feeding.

The width of the path along which drugs are transported is narrowed by an operator by selecting an appropriate one of a large number of drugs 5 as a model drug 5a, placing the model drug 5a in the model receiver 74, and adjusting the position of the link mechanism 73 to bring one end of the link mechanism 73 into contact with the model drug 5a.

After this operation, the first restricting member 71 and the second restricting member 72 are moved to swing in an interlocking manner by the link mechanism 73, and the width of the path along which drugs on the mount surface 23 are transported is narrowed by the first restricting member 71 and the second restricting member 72 to correspond to the diameter of the model drug 5a.

Random drug insertion is performed by the operator literally randomly inserting a large number of drugs 5 into the rotational container 80 through the opening in the upper portion of the first rotator 20.

The randomly stored drugs 5b thus inserted naturally gather on the inner bottom of the rotational container 80.

Thus, the drug feeder 10 is ready for operation. When the drug feeder 10 is operated at, for example, a simple continuous feed mode, the driving motor 54 then rotates at an appropriate speed in accordance with the control of the controller. In accordance with the rotation of the driving motor 54, the driving member 55 rotates about its axis, and the rotation of the driving member 55 is transmitted to the first rotator 20 with frictional transmission via the first transmission member 42, and also to the second rotator 30 with frictional transmission via the second transmission member 43. The first transmission member 42 and the second transmission member 43 rotate about their axes in the same direction, but the first transmission member 42 rotates faster than the second transmission member 43.

When the second rotator 30 rotates about its axis, of the randomly stored drugs 5b accumulated on the inner bottom of the rotational container 80, the drugs 5 on the inclined portion 33 are raised from the lower position to the upper position with the circulation of the saw-toothed inclined portion 33.

Most of the drugs 5 transported to a portion of the inclined portion 33 higher than the mount surface 23 are transferred to the mount surface 23 as a result of slipping down or rolling down due to the inclination of the inclined portion 33.

Some of the drugs 5 transported upward thereto by the inclined portion 33 may be left on the inclined portion 33 due to the reasons such as being blocked by preceding drugs 5 on the mount surface 23 or incidentally failing to slip down or roll down. Such drugs 5 are transported to the uppermost portion of the second rotator 30 with the further rotation of the second rotator 30 about its axis, come into contact with the far end portion 62 of the sorting member 60 at the uppermost portion of the second rotator 30, and, in reaction to the contact, move in the direction away from the mount surface 23 to slip down along the inclined surface of the recess 32.

In this manner, the excessive drugs 5 and the like are returned into the randomly stored drugs 5b. Thus, drugs 5, reduced to a fairly appropriate number, are fed to the path along which drugs on the mount surface 23 are transported.

The first rotator 20 rotates about its axis faster than the second rotator 30. Thus, when transferred from the inclined portion 33, the drugs 5 on the mount surface 23 spread to some extent in accordance with the difference in rotation speed to be aligned in a single vertical line. However, small drugs 5 may be arranged side by side. When the drugs 5 are transported to the first restricting member 71 by the rotation of the first rotator 20 about its axis, the drugs 5 aligned in a single vertical line pass the first restricting member 71 as they are. In the case of the drugs 5 arranged side by side, the drugs 5 on the inner peripheral side are pushed out from the surface of the mount surface 23 by interring with the first restricting member 71, and fall on the second rotator 30 to be returned into the randomly stored drugs 5b to cancel the side-by-side arrangement.

When, for example, a large number of drugs 5 are arranged side by side, some drugs 5 may slip by around the far end of the first restricting member 71 as a result of, for example, pushing each other. In such a case, some of the drugs 5 that have slipped by the first restricting member 71 may remain being arranged side by side. The drugs 5 that have slipped by the first restricting member 71 are transported to the second restricting member 72 by the rotation of the first rotator 20 about its axis, and are aligned in the similar manner as in the case of the first restricting member 71. Even when the drugs 5 that have slipped by the first restricting member 71 remain being arranged side by side, the number of such drugs 5 is small, and the drugs arranged side by side are usually disposed slightly adjacent to each other, or oblique to each other. Thus, side-by-side arrangement of the drugs 5 are promptly and fully canceled by the subsequent restriction of the second restricting member 72.

As illustrated in FIG. 13 or FIG. 14, the aligned drugs 5c that have been arranged in a line after passing through the restrictions of the first restricting member 71 and the second restricting member 72 are sequentially transported to the discharge guide 13 by the circulation of the mount surface 23 in accordance with the rotation of the first rotator 20 about its axis. The aligned drugs 5c come into contact with the discharge guide 13 that obliquely crosses the path along which drugs on the mount surface 23 are transported.

Most of the aligned drugs 5c are immediately transported along the discharge guide 13 and fed to the fall outlet port 14 in a line.

Depending on the way how the aligned drugs 5c come into contact with the discharge guide 13, some of the aligned drugs 5c may be slightly pushed toward the inner peripheral side of the mount surface 23. Even in such circumstances, the aligned drugs 5c are prevented from falling onto the first rotator 20 or being stuck between the mount surface 23 and the discharge guide 13 by the transport surface guide 12.

In this manner, all the aligned drugs 5c are transported in a line to the fall outlet port 14 without waste. The drugs 5 transported to the fall outlet port 14 are accelerated with the gravity to fall with a higher speed, so that the distance by which the preceding and subsequent drugs 5 are apart from each other is widened. At the position at which the preceding and subsequent drugs 5 are fully spaced apart from each other, a device such as a photosensor is disposed to detect the falling drugs 5 and to accurately count the drugs 5.

In some cases, such as after the completion of handling of a large number of drugs 5 with repeated arrangement and discharge of the drugs 5 or when the type of drug 5 is changed to another, the rotational container 80 frequently requires cleaning in addition to stopping of the operation of the drug feeder 10. In this case, as illustrated in FIG. 15, a component such as the peripheral wall 11 at the uppermost portion is firstly removed, and then, for example, the second rotator 30 is raised with the center projection 31 of the second rotator 30 being picked up, so that the entirety of the rotational container 80 is removed from the housing. The rotational container 80, which is merely supported by the support members 40, is easily removable and thus easily cleanable by, for example, washing of the whole component.

In this manner, the rotational container 80 can be easily and promptly cleaned after use. After being cleaned, the rotational container 80 is returned in the opposite order to be prepared for the next use.

In the present embodiment, the situation where the drugs 5 are aligned without fail has been described. Assume when the first rotator 20 and the second rotator 30 are undesirably hindered from rotating about their axes by, for example, a broken piece of the drug 5 stuck between components. Even in this case, since the first rotator 20 and the second rotator 30 and the transmission members 42 and 43 are engaged with each other with a contact for friction transmission, they slip without acting against a reaction force exceeding a necessary force for the normal operation. Thus, the load exerted on the components 20, 30, and 50 is not prevented from being excessively increased.

In the present embodiment, the length of the first restricting member 71 or the second restricting member 72 is not described. However, preferably, the restricting members 71 and 72 have a large length within an allowable range. This is because, as the axial rotation speed of the first rotator 20, the transport speed at which the drugs 5 are transported along the path along which drugs on the mount surface 23 are transported, and the angle of the restricting members 71 and 72 with respect to the path along which drugs are transported increase, the drugs 5 are more likely to undesirably curve further laterally when coming into contact with the restricting members 71 and 72. The multiple restricting members 71 and 72 and the sorting member 60 in cooperation with each other exert significant alignment workability. Thus, the restricting mechanism 70 does not restrict the height on the path along which drugs are transported.

The drug feeder of the present invention has been developed to be disposed in front of a drug counter. However, the drug feeder is not necessarily combined with a drug counter. The drug feeder may be combined with or installed in another device, such as a tablet splitter or a drug packaging device, or may be used alone.

REFERENCE SIGNS LIST 5 drug
5a model drug
5b randomly stored drug
5c aligned drug
10 drug feeder
11 peripheral wall
12 transport surface guide
13 discharge guide
14 fall outlet port
20 first rotator, annular rotator
21 lower portion
22 upper portion
23 mount surface, upper end peripheral edge portion, drug transport path
30 second rotator, tilting rotator 31 center projection
32 recess, center portion
33 inclined portion, peripheral edge portion
40 support member, supporting member
41 bearing member, radial bearing, dedicated supporting member
42 first transmission member, large-diameter-portion-exterior rotation transmission member, multifunction supporting member
43 second transmission member, small-diameter-portion-exterior rotation transmission member, multifunction supporting member
50 driving mechanism
51 driving member body, rotation driving member
52 large-diameter portion
53 small-diameter portion
54 driving motor
55 driving member
60 sorting member
61 base end portion
62 far end portion, drug contact portion
63 support portion
70 restricting mechanism
71 first restricting member
72 second restricting member
73 link mechanism
74 model receiver
80 rotational container

The invention claimed is:

1. A drug feeder, comprising:
an annular first rotator that includes a mount surface on which drugs are placed, and that is rotatable about a first rotation axis;
a second rotator that is disposed at a fixed position on an inner side of the first rotator while being rotatable about a second rotation axis, inclined with respect to the first rotation axis, the second rotator transporting the drugs onto the mount surface;
a restricting member that aligns the drugs disposed on the mount surface; and
a plurality of support members that support the first rotator and the second rotator mounted thereon from below the first rotator and the second rotator,
wherein the plurality of support members include a driving member that drives the first rotator and the second rotator to rotate,
wherein the driving member includes a large-diameter portion, which comes into contact with the first rotator, and a small-diameter portion, which comes into contact with the second rotator, and
wherein an upper surface of the second rotator includes a recess at a center portion, and an inclined portion, located closer to an outer periphery of the second rotator than the recess and having a surface extending away from the recess inclined, and
wherein the surface extends in a downward direction at an uppermost portion of the second rotator occupying the fixed position.

2. The drug feeder according to claim 1,
wherein an upper surface of the second rotator includes a recess at a center portion, and an inclined portion, located closer to an outer periphery of the second rotator than the recess and having a surface extending away from the recess inclined, and
wherein the surface extends in a downward direction at an uppermost portion of the second rotator occupying the fixed position.

3. A drug feeder, comprising:
an external annular rotator that is rotatable about a vertical line;
a tilting rotator installed on an inner side of the annular rotator while being rotatable about a line inclined with respect to the vertical line, the tilting rotator being filled in a hollow of the annular rotator;
a restricting member that aligns, during rotation of the annular rotator, solid drugs transported onto an upper end peripheral edge portion of the annular rotator from a surface of the tilting rotator with rotation of the tilting rotator;
a plurality of support members on which the annular rotator and the tilting rotator are mounted, the support members holding the annular rotator and the tilting rotator in fixed positions;
a rotation transmission member formed from any of the plurality of support members, the rotation transmission member transmitting rotation to the annular rotator and the tilting rotator with friction transmission; and
a rotation driving member, which includes a large-diameter portion having an outer side to which a portion of the rotation transmission member engaged with the annular rotator is fitted, and a small-diameter portion having an outer side to which a portion of the rotation transmission member engaged with the tilting rotator is fitted,
wherein an upper surface of the tilting rotator has a recessed center portion, and a peripheral edge portion extending further downward toward an outer side.

4. The drug feeder according to claim 3, wherein an upper surface of the tilting rotator has a recessed center portion, and a peripheral edge portion extending further downward toward an outer side.

5. A drug feeder, comprising:
an annular first rotator that includes a mount surface on which drugs are placed, and that is rotatable about a first rotation axis;
a second rotator that is disposed at a fixed position on an inner side of the first rotator while being rotatable about a second rotation axis, inclined with respect to the first rotation axis, the second rotator transporting the drugs onto the mount surface;
a restricting member that aligns the drugs disposed on the mount surface; and
a plurality of support members that support the first rotator and the second rotator mounted thereon from below the first rotator and the second rotator,
wherein the plurality of support members include a driving member that drives the first rotator and the second rotator to rotate
wherein an upper surface of the second rotator includes a recess at a center portion, and an inclined portion, located closer to an outer periphery of the second rotator than the recess and having a surface extending away from the recess inclined, and
wherein the surface extends in a downward direction at an uppermost portion of the second rotator occupying the fixed position.

6. The drug feeder according to claim 5, further comprising:
a sorting member located above the inclined portion, the sorting member pushing, back toward the recess at the uppermost portion, the drugs transported upward thereto by the inclined portion in accordance with rotation of the second rotator.

7. The drug feeder according to claim 6, wherein the restricting member occupies a position above the mount surface to gradually reduce a width, in a radial direction of the first rotator, of the mount surface on which the drugs are mountable from an upstream side to a downstream side in a rotation direction of the first rotator.

8. The drug feeder according to claim 7,
wherein the restricting member includes a plurality of restricting members arranged in the rotation direction, and
wherein the drug feeder further comprises a link mechanism that drives the plurality of restricting members in synchronization with each other to adjust amounts by which the restricting members gradually reduce the width.

9. A drug feeder, comprising:
an external annular rotator that is rotatable about a vertical line;
a tilting rotator installed on an inner side of the annular rotator while being rotatable about a line inclined with respect to the vertical line, the tilting rotator being filled in a hollow of the annular rotator;
a restricting member that aligns, during rotation of the annular rotator, solid drugs transported onto an upper end peripheral edge portion of the annular rotator from a surface of the tilting rotator with rotation of the tilting rotator;
a plurality of support members on which the annular rotator and the tilting rotator are mounted, the support members holding the annular rotator and the tilting rotator in fixed positions; and
a rotation transmission member formed from any of the plurality of support members, the rotation transmission member transmitting rotation to the annular rotator and the tilting rotator with friction transmission,
wherein an upper surface of the tilting rotator has a recessed center portion, and a peripheral edge portion extending further downward toward an outer side.

10. The drug feeder according to claim 9, further comprising:
a sorting member that has a drug contact portion located above the peripheral edge portion of the tilting rotator, the sorting member urging a contact drug toward the center portion of the tilting rotator.

11. The drug feeder according to claim 10, wherein the restricting member narrows a width of a drug transport path on an upper end peripheral edge portion of the annular rotator from an outer periphery.

12. The drug feeder according to claim 11,
wherein the restricting member adjusts an amount by which the width of the drug transport path is narrowed, and includes a plurality of restricting members, and
wherein the drug feeder further comprises a link mechanism that interlocks amounts adjusted by the plurality of restricting members.

* * * * *